Patented May 30, 1950

2,509,588

UNITED STATES PATENT OFFICE 2,509,588

EMULSION FLUID FOR DRILLING WELLS

Reginald D. Dawson, Berkeley, Calif., assignor to Shell Development Company, San Francisco, Calif., a corporation of Delaware No Drawing. Application November 4, 1946, Serial No. 707,754

9 Claims. (Cl. 252—8.5)

This invention relates to the drilling of oil and gas wells and pertains more particularly to the use and composition of an improved drilling fluid.

Fluids commonly used for the drilling of oil and gas wells are of two general types: water-base drilling fluids comprising, for example, a clay suspended in water, and oil-base drilling fluids comprising, for example, a clay or calcium carbonate suspended in mineral oil.

A third type of drilling fluid, which has recently been developed, is one of oil-in-water or water-in-oil emulsions, for example, emulsions of mineral oil in water or water in mineral oil formed by means of emulsifiers such as: sulfuric acid; Turkey-red oil; soaps of fatty acids, for example sodium oleate; emulsoid colloids, for example starch, sodium alginate, etc. Varying amounts of finely-divided clay, silica, calcium carbonate, blown asphalt, and other materials may be added to these emulsions to improve their properties and control their weight.

The use of drilling emulsions has several advantages over the use of either water-base or oil-base drilling fluids.

Drilling emulsions are generally superior to water-base drilling fluids in forming a very thin and substantially fluid-impervious mudsheath on the walls of a borehole, in eliminating fluid loss to the formation and contamination of producing formations by an aqueous liquid, etc.

Drilling emulsions are generally superior to oil-base drilling fluids from the point of view of costs, of ease of handling, of suitability for electrical logging, etc.

The disadvantage for general use of drilling emulsions is, however, their lack of stability in the presence of even moderately high concentrations of electrolytes, such as brines entering the borehole from the formation and becoming admixed to the drilling fluid.

Thus, drilling emulsions, formed by means of the emulsifiers listed above break down immediately or after a few hours of use or storage upon contamination with small concentrations of electrolytes, such as, for example, a 1% solution of sodium chloride. It is well known that soaps of various fatty acids, oleates, stearates, linoleates, etc., for example, sodium oleate, can be used as emulsifying agents in the preparation of oil and water emulsions, but these emulsions are generally unsatisfactory for drilling purposes since they become unstable and break down when contaminated with solution of electrolytes, for example, sodium chloride.

It is therefore an object of this invention to provide an improved oil and water drilling emulsion or fluid which is substantially stable in the presence of contaminating formation salts or brines.

It has now been discovered that drilling fluids of improved characteristics may be prepared by forming emulsions comprising oil, water, an emulsifying agent made from a basic reacting agent and an organic carboxylic acid having from 10 to 14 carbon atoms; and, if desired, various amounts of finely-divided clay, silica, calcium carbonate, and other materials to control the properties or weight of the drilling fluid.

There are two general types of oil and water emulsions; oil-in-water and water-in-oil emulsions. The present invention is concerned with oil-in-water emulsions where the oil is present in the dispersed phase while the water forms the continuous phase.

The soaps used as emulsifying agents may be made from reacting a basic reacting agent with any of the fatty acids of intermediate chain length having from 10 to 14 carbon atoms, and preferably 12 carbon atoms, such as lauric acid. Much superior results were obtained in stabilizing emulsions contaminated with brines when soaps made of the preferred composition of a basic reacting agent and lauric acid were used as the emulsifying agent. A good commercial source of lauric acid, for making these soaps, is coconut oil which contains a substantial portion of about 50% lauric acid as the glyceryl ester. The basic reacting agent used in making the emulsifying agent may be either an inorganic or an organic basic reacting agent. The inorganic type includes alkali basic reacting agents such as sodium or potassium hydroxides, phosphates, silicates, carbonates, and the like. Organic basic reacting agents may be of several types such as alkanol amines, e. g. triethanolamine, diethanolamine; the corresponding cyclic ether amine substances; e. g. morpholine; heterocycloaliphaticamines, e. g. piperazine; and quaternary ammonium bases, particularly such bases containing polar-substituted hydrocarbon radicals, e. g. triethanolmethyl ammonium hydroxide, dimethyl-morpholinium-hydroxide. Oils, such as fuel oil, crude oil, Diesel oil, kerosene, stove oil and the like may be used to make the oil-water emulsion.

Various methods may be selectively used in forming well drilling emulsions by means of these emulsifying agents according to the present invention.

If it is desired to prepare a very light or low specific gravity drilling emulsion, a mineral oil, such as crude oil, gas oil, Diesel oil, etc., may be emulsified directly in water by means of a high speed hopper or of a jet device such as a so-called mud-gun, a relatively small quantity, such as 2 to 3% of a soap, resulting from the reaction of triethanolamine and coconut oil fatty acids being added to form and stabilize the emulsion. Depending on the specific gravity of the mineral oil, which should preferably be of a range from 10 to 40° A. P. I., and on the particular specific gravity of the drilling emulsion which it is thus desired to obtain for a particular purpose, for example, for drilling through low pressure formations, the proportions in which oil is emulsified in water may be varied within fairly wide limits, although a ratio of about 25 to 50% by volume of the mineral oil to about 75 to 50% of water has been found to give especially favorable results.

Although in the above cases the present emulsions may consist only of the three components described, that is, water, mineral oil and the emulsifying agent, various other components may be added thereto if desired for the purpose of controlling some specific properties of the emulsions.

Thus, if it is desired to improve their plastering properties and thus to minimize the so-called filtering losses of the fluid to the formation, a blown asphalt may be added to the emulsion, and preferably to the mineral oil prior to emulsification, in relatively small quantities such as from 5 to 15% on the weight of the mineral oil, as described in my Patent No. 2,223,027.

If it is desired to give a greater consistency to the present emulsions and to increase their capacity for carrying drill cutting, a finely-divided solid and preferably colloidal material may be admixed to the emulsion, preferably during the emulsification process, to form a stable three-phase emulsion. Thus bentonite may be added in amounts from 1 to 5%, or ordinary drilling clay in amounts from 1 to 40% by weight on the total weight of the emulsion.

Furthermore, the weight or specific gravity of the present emulsions can be accurately controlled by adding thereto, in a suitably comminuted form any desired weighting material such as calcium carbonate, barytes, iron oxide, galena, etc. These materials have been found to remain stably suspended in the present emulsions, while maintaining the specific gravity thereof within any desired range, such as from 67 to 120 lbs. per cubic foot.

Since the present emulsions are used on drilling installations wherein a drilling fluid of either the water-base or the oil-base type is usually already available, it has been found advantageous to apply the emulsifying agents of the present inventions in forming drilling emulsions with these drilling fluids as starting material.

Thus, a water-base drilling fluid comprising water and clay and having a weight such, for example, as 86 lbs. per cubic foot, may be mixed with approximately 25 to 50% by volume of a heavy crude oil with the addition of 2.0 to 3.0% (calculated on the weight of the total mixture) of an emulsifying agent comprising, for example, a soap, resulting from the reaction of potassium hydroxide and coconut oil fatty acids, to give a stable emulsion having a weight of approximately 82 to 72 lbs. per cubic foot.

Likewise, an oil-base drilling fluid comprising, for example, crude oil or a Diesel oil and calcium carbonate suspended therein by means of agents such as tall oil and sodium silicate or hydroxide, as described in Patent No. 2,350,154 and having a weight such, for example, as 78 lbs. per cubic foot, may be mixed with approximately from one to three times its volume of water and emulsified therewith with the addition of an emulsifying agent comprising, for example, a soap, resulting from the reaction of triethanolamine or morpholine and coconut oil fatty acids to give a stable emulsion having a weight of approximately 70 to 66 lbs. per cubic foot.

In this connection, it is especially important to note that the emulsifying action of the present soaps, resulting from the reaction of a basic reacting agent and a carboxylic acid of intermediate chain length, is not in any way impaired by any chemical compounds which may have been previously used in controlling the viscosity, stability or other properties of such water-base or oil-base drilling fluids.

The drilling emulsions formed in the ways described hereinabove have the following advantages over water-base and oil base drilling fluids: (1) they are considerably cheaper than oil-base drilling fluids, whereby drilling costs are greatly decreased; (2) their plastering properties are much superior to those of water-base drilling fluids and compare favorably with those of oil-base drilling fluids, whereby filtering losses to the formation are greatly minimized; (3) they are much better adapted than oil-base drilling fluids for surveying wells by electrical logging methods; (4) greater drilling speeds can in general be realized with the drilling emulsions of the present type than with either water-base or oil-base drilling fluids.

*Example*

Three drilling emulsions were prepared by emulsifying a Ventura clay water base drilling fluid treated with 0.2% by weight of sodium hexameta phosphate, and weighing 75 lbs. per cubic foot with a stove oil in the following proportions by weight.

| | Per cent |
|---|---|
| Ventura drilling fluid | 75 |
| Stove oil | 22 |
| Emulsifier | 3 |

The following emulsifiers were used for the three emulsions:

Emulsion No. 1—Potassium soap of oleic acid

Emulsion No. 2—Potassium soap of coconut fatty acids

Emulsion No. 3—Triethanolamine soap of coconut fatty acids

The three emulsions, after being subjected to filter tests for 60 minutes at 80° C. and 500 lbs. per sq. in. pressure, were contaminated with NaCl salt to a concentration of 3% by weight on the water of the aqueous phase, and the filter tests were repeated under identical conditions.

The following filter losses were recorded for the three emulsions:

| | Before Contamination | After Contamination |
|---|---|---|
| | Cc. | Cc. |
| Emulsion No. 1 | 10.5 | 26.2 |
| Emulsion No. 2 | 8.7 | 8.2 |
| Emulsion No. 3 | 9.7 | 9.2 |

These filter tests indicate, first, that the drilling emulsions of the present invention have, even in the absence of contamination, better filtering properties than conventional emulsions and, second, that whereas the filtering properties of conventional emulsions deteriorate upon contamination with salt to such a point that filter losses rise to a value substantially in excess of the original value, the filtering properties of the present emulsions are in no way adversely affected by such contamination, but are even somewhat improved thereby.

I claim as my invention:

1. A drilling fluid for wells, comprising a predominant quantity of water and mineral oil emulsified therein, a finely divided solid weighting material dispersed in said emulsion, to give thereto a gravity from 67 to 120 lbs. per cubic foot and a relatively small quantity of emulsifying agent capable of stabilizing the emulsion against brine contamination, said emulsifying agent comprising the reaction product of a basic reacting agent capable of forming a water-soluble soap with lauric acid.

2. A drilling fluid for wells comprising a predominant quantity of water and mineral oil emulsified therein, a finely divided solid weighting material dispersed in said emulsion, to give thereto a gravity from 67 to 120 lbs. per cubic foot and a relatively small quantity of emulsifying agent capable of stabilizing the emulsion against brine contamination, said emulsifying agent comprising the reaction product of morpholine with fatty acids containing from 10 to 14 carbon atoms.

3. A drilling fluid for wells, comprising a predominant quantity of water and mineral oil emulsified therein, a finely divided solid weighting material dispersed in said emulsion, to give thereto a gravity from 67 to 120 lbs. per cubic foot and a relatively small quantity of emulsifying agent capable of stabilizing the emulsion against brine contamination, said emulsifying agent comprising the reaction product of triethanolamine with fatty acids containing from 10 to 14 carbon atoms.

4. A drilling fluid for wells, comprising an emulsion of approximately 50 to 75% by volume of water and 50 to 25% by volume of a mineral oil, a finely divided solid weighting material dispersed in said emulsion, to give thereto a gravity from 67 to 120 lbs. per cubic foot and a small quantity of emulsifying agent capable of stabilizing the emulsion against brine contamination, said agent constituting approximately 2 to 3% by weight of the total emulsion, said emulsifying agent consisting of the reaction product of a basic reacting agent capable of forming a water-soluble soap with fatty acids containing 10 to 14 carbon atoms.

5. A drilling fluid for wells, comprising an emulsion of approximately 50 to 75% by volume of water and 50 to 25% by volume of a mineral oil, a finely divided solid weighting material dispersed in said emulsion, to give thereto a gravity from 67 to 120 lbs. per cubic foot and a small quantity of emulsifying agent capable of stabilizing the emulsion against brine contamination, said agent constituting approximately 2 to 3% by weight of the total emulsion, said emulsifying agent consisting of the reaction product of a basic reacting agent capable of forming a water-soluble soap with lauric acid.

6. A drilling fluid for wells, comprising an emulsion of approximately 50 to 75% by volume of water and 50 to 25% by volume of a mineral oil, a finely divided solid weighting material dispersed in said emulsion, to give thereto a gravity from 67 to 120 lbs. per cubic foot and a small quantity of emulsifying agent capable of stabilizing the emulsion against brine contamination, said agent constituting approximately 2 to 3% by weight of the total emulsion, said emulsifying agent consisting of the reaction product of a basic reacting agent capable of forming a water-soluble soap with coconut oil.

7. A drilling fluid for wells, comprising an emulsion of approximately 50 to 75% by volume of water and 50 to 25% by volume of a mineral oil, a finely divided solid weighting material dispersed in said emulsion, to give thereto a gravity from 67 to 120 lbs. per cubic foot and a small quantity of emulsifying agent capable of stabilizing the emulsion against brine contamination, said agent constituting approximately 2 to 3% by weight of the total emulsion, said emulsifying agent consisting of an alkanolamine laurate.

8. A drilling fluid for wells, comprising a predominant quantity of water and mineral oil emulsified therein, a finely divided solid material dispersed in said emulsion to give thereto a gravity from 67 to 120 lbs. per cubic foot and a relatively small quantity of emulsifying agent capable of stabilizing the emulsion against brine contamination, said emulsifying agent comprising the reaction product of a basic reacting agent capable of forming a water-soluble soap with aliphatic fatty acids having from 10 to 14 carbon atoms.

9. A drilling emulsion fluid for wells comprising approximately 75 per cent by weight of an aqueous phase, approximately 22 per cent of an oil phase emulsified therein, said aqueous phase consisting substantially of a suspension of clay in water having a density of approximately 75 lbs. per cubic foot, said oil phase consisting of a petroleum distillate having a density of from 10 to 40° A. P. I., and approximately 3 per cent of a potassium soap of coconut fatty acids as emulsifying agent.

REGINALD D. DAWSON.

REFERENCES CITED

The following references are of record in the file of this patent:

UNITED STATES PATENTS

| Number | Name | Date |
|---|---|---|
| 2,015,043 | Stratford | Sept. 17, 1935 |
| 2,099,825 | Rolshausen | Nov. 23, 1937 |
| 2,238,478 | Ott | Apr. 15, 1941 |
| 2,247,577 | Flaxman | July 1, 1941 |
| 2,304,125 | Shutt et al. | Dec. 8, 1942 |
| 2,374,678 | Gruenwald | May 1, 1945 |
| 2,423,144 | Gregg | July 1, 1947 |